US008850206B2

(12) United States Patent
Farrugia et al.

(10) Patent No.: US 8,850,206 B2
(45) Date of Patent: Sep. 30, 2014

(54) CLIENT-SERVER SYSTEM WITH SECURITY FOR UNTRUSTED SERVER

(75) Inventors: Augustin J. Farrugia, Cuptertino, CA (US); Gelareh Taban, Sunnyvale, CA (US); Amine El Kamel, San Francisco, CA (US); Gianpaolo Fasoli, Palo Alto, CA (US); Srinivas Vedula, Fremont, CA (US)

(73) Assignee: Apple Inc., Cupertino, CA (US)

( * ) Notice: Subject to any disclaimer, the term of this patent is extended or adjusted under 35 U.S.C. 154(b) by 172 days.

(21) Appl. No.: 13/297,200

(22) Filed: Nov. 15, 2011

(65) Prior Publication Data

US 2013/0124866 A1 May 16, 2013

(51) Int. Cl.
*H04L 29/06* (2006.01)
*H04L 9/08* (2006.01)

(52) U.S. Cl.
CPC ............ *H04L 9/0822* (2013.01); *H04L 9/0861* (2013.01); *H04L 9/0825* (2013.01); *H04L 2209/603* (2013.01)
USPC ........................................................ 713/171

(58) Field of Classification Search
CPC .... H04L 9/0825; H04L 9/0822; H04L 9/0861
USPC ........................................................ 713/171
See application file for complete search history.

(56) References Cited

U.S. PATENT DOCUMENTS

| 6,748,532 | B1 * | 6/2004 | Digiorgio et al. | ............. 713/159 |
| 2005/0193387 | A1 | 9/2005 | Uramatsu et al. | |
| 2006/0195820 | A1 | 8/2006 | Curtis et al. | |
| 2009/0037725 | A1 | 2/2009 | Farrugia et al. | |
| 2010/0031051 | A1 * | 2/2010 | Machani et al. | ............. 713/181 |

OTHER PUBLICATIONS

Weis et al. ( Security and Privacy Aspects of Low-Cost Radio Frequency Identification Systems, 2004).*
PCT International Search Report and Written Opinion of the International Searching Authority for PCT/US2012/057944 mailed Jan. 30, 2013.

* cited by examiner

*Primary Examiner* — Saleh Najjar
*Assistant Examiner* — Oleg Korsak
(74) *Attorney, Agent, or Firm* — Blakely, Sokoloff, Taylor & Zafman LLP

(57) ABSTRACT

In the context of a computer client-server architecture, typically used in the Internet for communicating between a server and applications running on user computers (clients), a method is provided for enhancing security in the context of digital rights management (DRM) where the server is an untrusted server that may not be secure, but the client is secure. This method operates to authenticate the server to the client and vice versa to defeat hacking attacks intended to obtain confidential information. Values passed between the server and the client include encrypted random numbers, authentication values and other verification data generated using cryptographic techniques including double encryption.

28 Claims, 4 Drawing Sheets

CLIENT-SERVER SYSTEM WITH SECURITY FOR UNTRUSTED SERVER

FIELD OF THE INVENTION

This invention relates to client-server computing systems and more specifically to digital rights management (DRM) for use in client-server systems.

BACKGROUND

Digital rights management (DRM) is well known for protection of digital content, for instance including but not limited to audio and/or video data, in a playback device such as a computer or computing device or audio or video media player. The protection of digital content transferred between computers over a network and transferred from a computer or other host device or a server to an associated playback device is important for many organizations. The DRM process often involves encrypting the pieces of content (e.g., encrypting the binary form of the content) to restrict usage to those who have been granted a right to the content, which is for instance pieces of music or video programs.

Cryptography is the traditional protection method, but for many digital file transfer situations, a party that legitimately receives the content might try to break the DRM protection scheme, so as to give illicit access to third parties. Hence, an identified weak link in the DRM security is in the overall process, rather than the encryption of the content.

Moreover in this field generally and more generally in the computer field, the well known client-server computing architecture separates a client from a server and is generally implemented over a computer network, such as the Internet. Each client or server connected to a network is also referred to as a node. The basic type of client-server architecture employs two types of nodes, which are respectively clients and servers. This architecture allows computing devices to share files and resources. Each instance of the client software can send data requests to one or more connected servers. In turn, the servers accept those requests, process them, and return the requested information to the client. Clients may be web browsers, although this is not limiting. Servers typically include web servers, database servers, and email servers. The interaction between client and server is conventionally described using sequence diagrams.

The client-server architecture enables the roles and responsibilities of the computing system to be distributed among several independent computing platforms which are coupled only through the network. Note that the terms "client" and "server" as used here generally refer to software entities, which are executed respectively on client platforms or devices and server platforms or devices, which are the physical computers. Typically data is stored at a head end on the server or servers, which generally in the field have greater security controls than do the clients. That is, typically the servers are maintained by some sort of parent organization and are in a secure area physically and allow only very limited access by members of the public who typically control the client platforms. In general in the field it is believed that servers can better control access and resources, so as to guarantee that only those clients with the appropriate permissions may access and change data. Since thereby in field generally, data storage is centralized, updates to that data are easier to administer than would be the case under a peer-to-peer (non-client server) architecture.

Moreover in general, it is well known that the client-server architecture is subject to security deficiencies in terms of user and other data being obtainable illegitimately by hackers. This also pertains to video content being obtained illegitimately by hackers. Note that generally in the field, security breaches tend to focus on the server, which typically stores large amounts of information and also user information. Hence most work in the field is focused on security weaknesses in the server to prevent penetrations by hackers.

Further see patent publication US2009/0037725A1 commonly owned, published Feb. 5, 2009 and entitled "Client-Server Opaque Token Passing Apparatus and Method" incorporated herein by reference in its entirety, where a client-server architecture is provided where in order to enhance security, the bulk of the security verification activity takes place at the client rather than the server. In that patent application, this is accomplished by using a token passing scheme.

SUMMARY

However, the present inventors have identified a deficiency even with that approach which is that in some cases the server itself may be an untrusted entity. That is the server platform or the server software may not be under the control of the entity which is responsible for the overall security of the content and the user devices. In that case the token passing scheme may not be adequate. Note that the untrusted server is not the usual situation. Generally the clients are not trusted and while there are attempts to penetrate server security, generally the situation where a hacker or attacker has full access to the server is not conventional or usual.

Therefore the present invention is directed to ensuring security of user data and content, even in the case of an untrusted server in a client-server architecture in conjunction with digital rights management. Therefore in accordance with the present invention, the client is regarded as a trusted, that is not penetrated or easily attacked entity, and the server is regarded as the untrusted or easily attacked entity. In accordance with the invention then in this situation, three layers of security are provided. First, there is a public key-private key layer of security, which is conventional for encrypting DRM information. The second layer of content is referred to here as an application secret cryptographic key which has associated derivation functions to generate it as described hereinafter. This also uses cryptography to protect some of the relevant DRM information. The third layer of security is an authentication process between the (trusted) client and the (untrusted) server to authenticate the server to the client. Thus if the server has been penetrated or is insecure, this will still protect the relevant user and/or content information.

In one embodiment, the security functionality is embodied in software modules (code), one portion of which is resident in the user device, also referred to as a client device, and the other portion of which is resident in the server platform and both of which are involved in the DRM aspects of providing content from a head end to a user device. Note that the interaction between the servers and user devices are typically in the form of communications over the Internet or some other computer network.

DETAILED DESCRIPTION

Figure 1:
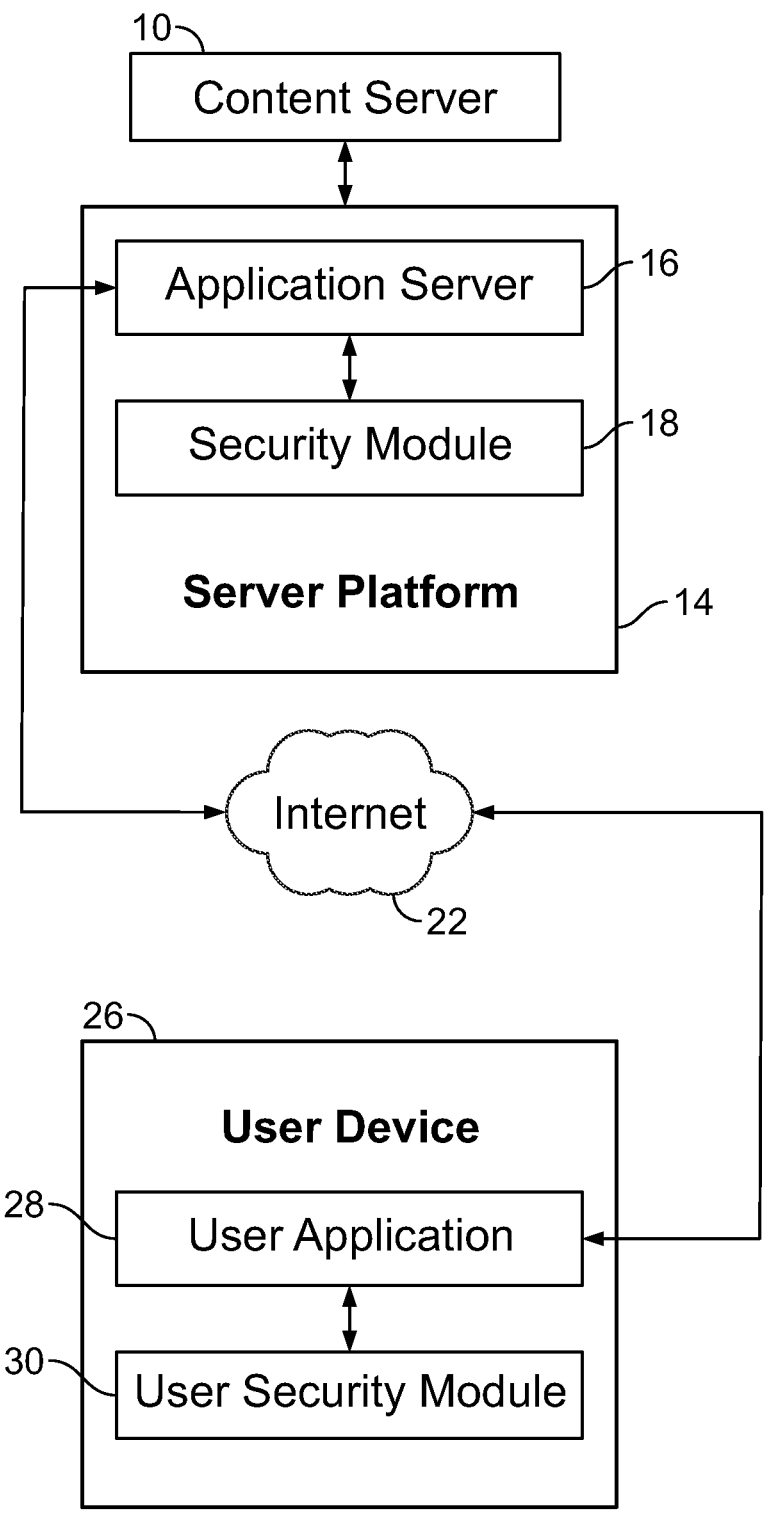
FIG. 1 shows a client-server computing system in accordance with the invention.

FIG. 1 shows in a high level block diagram a mostly conventional client-server computer system in accordance with the invention. Only certain relevant portions are shown. The other conventional portions are omitted for ease of understanding. There is a typical conventional content server 10, which is essentially a storage system which stores content (assets) such as video programs and pieces of music, etc., typically which are sold or rented to users as well known in the Internet and computing fields. The next element is a server platform 14, also part of the head end here along with the content server 10, which is in communication with the content server 10. This communication may be direct or may be via the Internet or other computer network approaches. The server platform 14 includes the application server (software) 16 which is largely conventional for serving the content to users and an associated security module 18 in accordance with the invention as described further below.

The server platform 14 via the application server 16 is in communication via the Internet 22 shown here conventionally as a cloud with an exemplary user device, also referred to as a user platform 26. This is typically a computer, Smart Phone, computer enabled media player, etc. There are typically many such user devices and only one is shown only for simplicity of illustration. User device 26 is largely conventional and includes a user application (software) 28 which interacts with the application server 16 to download for instance music or videos assets, as is conventional. Also provided in the user device 26 is a user security module 30 in accordance with the invention, the operation of which is described further below. Note that the application server 16 and the user application 28 for instance may involve media player software for downloading and playing music and videos at the user device 26.

Figure 2:
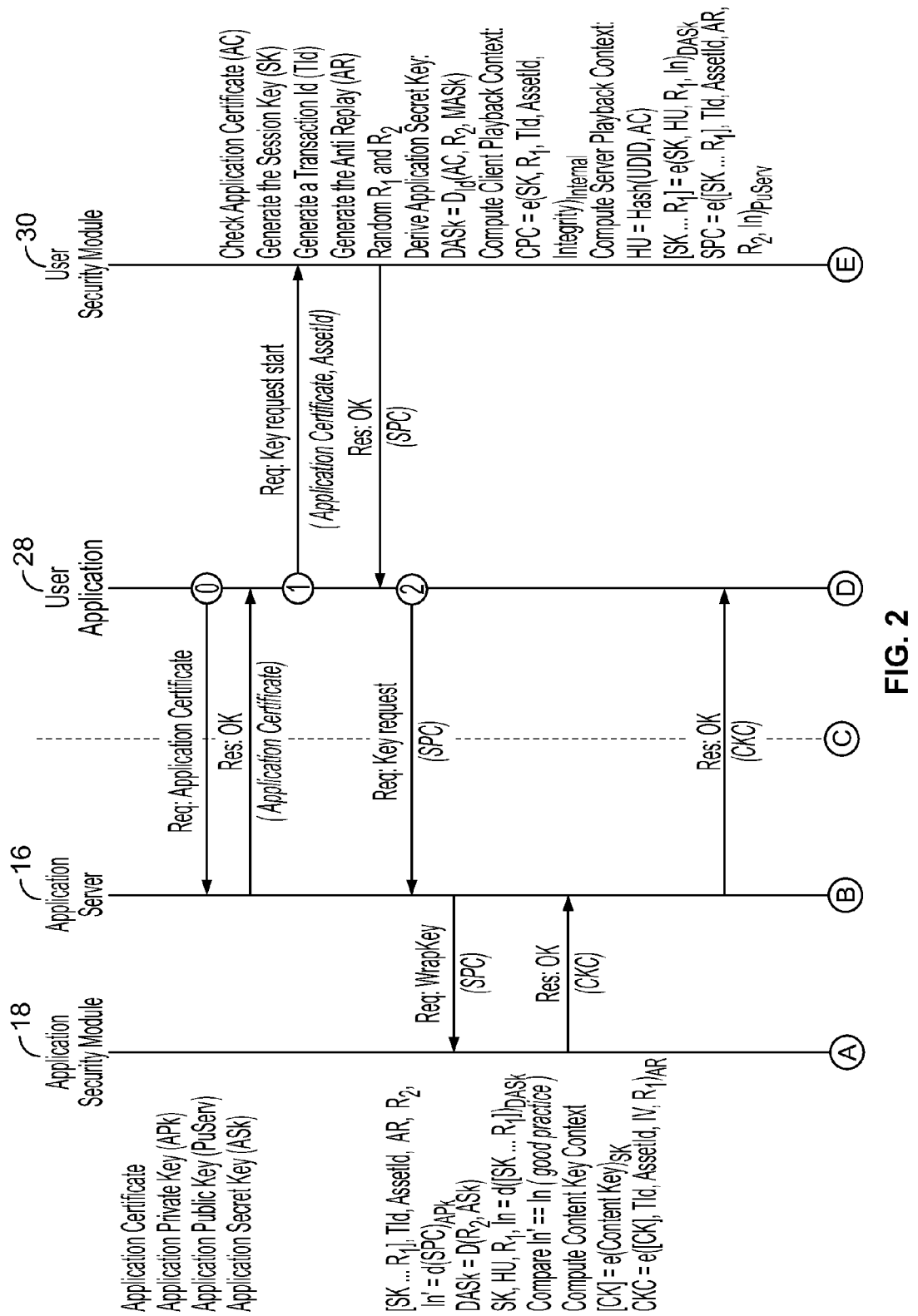
FIG. 2 is a sequence diagram showing details of the functionality of embodiments of the present invention.
Figure 2:
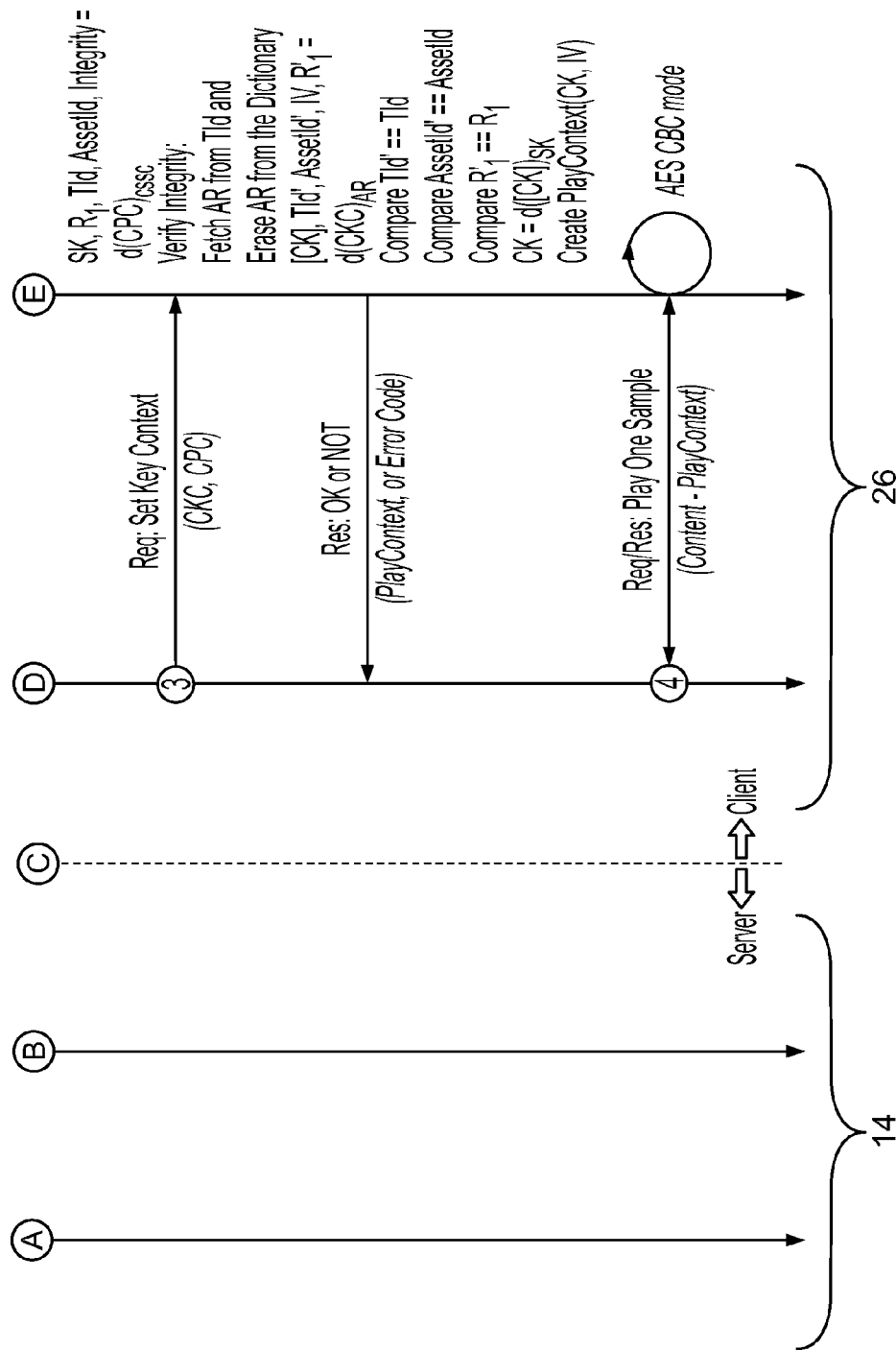

FIG. 2 is a sequence diagram of the type referred to above and used in this field to illustrate a sequence of actions involving exchanges between a client and server, in this case for DRM (content security) type transactions. Each of the four vertical lines represents one of the corresponding elements shown in FIG. 2, which are the application security module 18, the associated application server 16 which together are resident in the server platform 14, and the client or user device 26, which includes the user application 28 and the user security module 30. The sequence events is from top to bottom as indicated by the arrows on each of the vertical lines and includes the steps numbered consecutively 0, 1, 2, 3 and 4, each of which involves several sub-actions.

While the relationships in FIG. 2 between the various functions and variables are expressed in algebraic form, it is to be understood that this is merely a representation and typically these actions are carried out by computer software (code) in the application security module 18 and user security module 30. Note that the depicted actions taken by the application server 16 and user application 28 are largely conventional. Moreover each of the various cryptographic elements and other calculations is largely conventional. The following table lists each of the variables and functions illustrated in FIG. 2 in more convenient form and follows approximately in order from top to bottom the variables and calculations illustrated in FIG. 2. In general, the term Req refers to a request and the term Res refers to a response to a request. Hence typically the request and response are paired. The direction of the transmission of data is shown by the arrows on the various horizontal lines in FIG. 2, as is conventional.

As shown in the upper left hand portion of FIG. 2, the operation of the application security module 18 begins with several variables previously stored in its associated memory which are the application certificate, the application private key, the application public key and the application secret key which is a key to a symmetric cipher as explained below. The public key and private key indicate use of public-private key cryptography in which messages are encrypted using a public key and are decrypted using a different private key, for instance the RSA type ciphers. In this case this cipher is used to protect the DRM information and not the underlying content item, which is encrypted using a symmetric block cipher as is conventional and explained further below.

At the initial step 0, the user application 28 transmits a request for an application (meaning a software application as explained above) certificate to the application server 16 which is conventional and receives and responds with the application certificate. This is a conventional exchange. The term "OK" indicates that the exchange is satisfactory or valid. Then at step 1, the method actually in accordance with the invention begins at which point a request for a key request start is transmitted from the user application to the user security module 13. This means a request for a start of the key exchange process. This request is accompanied by the received application certificate and an asset identifier (ID). The asset ID is a unique number or identifier associated with a particular asset, which is a piece of content such as a song or a video program.

At this point as illustrated at the upper right hand portion of FIG. 2, the user security module checks the received application certificate for validity, and generates a session key SK. This is done conventionally. The user security module also generates a transaction identifier (ID) and an anti-replay value. Anti-replay values are well known and provide some sort of timestamp or similar unique identifier pertaining to a particular transaction in the DRM field. The user security module also generates two random numbers or pseudo random numbers denominated here R1 and R2 and derives (calculates) a derived application secret key (DASk) independently of the actual application secret key (ASk) stored at application security module 18. The calculation to derive the application security key DASk is indicated as being application of a derivation function $D_{id}$ to the input values AC, R2 and MASk where MASk is the master application secret key previously stored in memory associated with the user security module.

The user security module then computes the client playback context value as shown, which is an encrypted value of a message which is the concatenated session key, the first random number, the transaction identifier, the asset identifier, and an integrity value. This data (message) is encrypted using a key designated here as internal because it is internal to the user security module. This encryption typically uses the AES cipher, which the Advanced Encryption Standard cipher operating in the CBC mode. This is a well known cipher which is a symmetric block cipher. CBC mode refers to cipher block chaining, which is a well known use of the AES cipher which enhances security by chaining together the encipherment of the successive blocks of data. Of course use of the AES cipher with the CBC is merely illustrative here. The table below indicates more explicitly the nature of each of the functions used in FIG. 2.

The user security module also computes the server playback context value referred to as SPC which is a partially double encrypted message consisting of several concatenated variables as indicated, including the session key and a hash value of the variable UDID which is the unique device identifier associated with the client device 26 and the application certificate. The encryption key for the first stage of this double encryption is the derived application secret key. Also provided as part of this message which is encrypted is the transaction identifier, asset identifier anti-replay value, the second random number and an integrity value IN.

The second stage of computing the server playback context uses another key designated here as PUserver, which is the application public key. Since this is in the context of private key/public key encryption, this key has been published and is easily available. Then in response, the user security module transmits the OK or alright response to the user application and this response is accompanied by the SPC value. Then at step 2, the key request with the SPC value is transmitted to the application server which in turn transmits a request for the wrap key, including the SPC value to the application security module 18. Note that in the transaction just prior to step 2, there is no requirement to transmit the CPC from the user security module 30 to the user application 28.

At this point as shown in the left hand portion in the middle of FIG. 2, the application security module carries out the calculation shown there by recovering from the SPC by a decryption function using its decryption key application private key to recover the values as shown which involve the encrypted values of SK, etc., the transaction identifier, the asset identifier, the anti-replay value, the second random number, and the value IN. The application security module then using its derivation function D derives from the recovered values R2 and the application security key a derived second application security key DASk. (This should be the same value as the DASk generated by the user security module.) It also recovers the session key, hash value, the first random number, and the integrity identifier by decrypting as shown the values SK through R1.

Then the application security module performs an authentication or verification set of actions. It compares the first recovered IN value to the second recovered IN value (due to the double encryption of same by the user security module) to see if these are identical values. This is indicated here as being "good practice" that is the security is verified. The application security module also computes the content key context value CKC as shown by first encrypting the content key (which it has received or generated conventionally) using the session key SK. The application security module then computes the content key context CKC as shown by an encryption of the message including the encrypted content key, the transaction identifier, the asset identifier, a cryptographic initialization vector, and the first random number, using as a key the previously recovered anti-replay value. At this point (assuming that the In verification check has passed), the application security module transmits the response OK accompanied by this content key context value back to the application server.

At this point, step 3 takes place and the request for the set key context accompanied by the CKC and CPC values is transmitted back to the user security module 30. The user security module 30 at this point performs the computations shown in the lower right hand portion of FIG. 2 by first extracting from the received CPC value by decrypting it using key CSSC, the values of the session key, the first random number, the transaction identifier, the asset identifier, and the integrity value. The integrity value is then verified using the earlier generated integrity value by comparing the earlier generated integrity value at the user security module with that just extracted.

The user security module then recovers its anti-replay value AR from the transaction identifier and then erases that anti-replay value from its dictionary (memory). This is done to make sure that the particular anti-replay value is not used again. At this point, by decrypting the value CKC which is the content key context using the fetched anti-replay value, the user security module extracts the encrypted content key CK, the obtained transaction identifier, the obtained asset identifier, the initialization vector IV and the random number R1 as transmitted from the application security module. Note that the value IV is an initialization vector which is conventional in the context of the AES cipher in the CBC mode.

The user security module then compares the extracted transaction identifier with its earlier generated transaction identifier to verify that they are the same and does the same for the asset identifier and for the first random number R1. If all these checks are passed then the content key CK is decrypted from the encrypted version of the content key using the session key SK.

At this point, the user security module creates the play context value which consists of the content key CK and the initialization vector IV which are passed to a conventional decryption module associated with the user application. The content key CK is then used to decrypt one sample (portion) of the received asset. The actual transmission of the asset is not shown here; it may have taken place earlier since it was in encrypted form. At this point at step 4, the user security module requests the user application to play one sample of the content and the user application responds. This step 4 is repeated with each sample or portion or block of the content (asset). Hence the indication of the circularity of application of the AES CBC mode decryption.

Thus as is typical here, the use of the public key/private key cipher is used only to protect the DRM information and the actual asset is encrypted using a symmetric block cipher. This is typically done because symmetric block ciphers are much faster to execute than are public key/private key type ciphers.

Note that in step 3 if the response is OK, only then is the play context transmitted. Otherwise if the security checks are not passed then an error code is transmitted and the transaction stops. That is generally the case in FIG. 2—if any of the responses are other than OK or verified, the transaction is typically halted at that point as an indication of some sort of security failure or breach.

As indicated immediately following the table below, certain mathematical relationships are provided between the two derivation functions D and $D_{id}$. The basic relationship is that the composition of derivation function D with some generalized function F is equal to derivation function $D_{id}$. This is an offline relationship established when the present system is set up. Also the same general function F indicates the relationship between the master application secret key and the application certificate and the application specific key used for this transaction. The general security goal is that a hacker cannot derive the generalized function F even if he knows the two derivation functions D and $D_{id}$. Similarly he cannot derive the derivation function $D_{id}$ from the derivation function D. Further, the encryption/decryption functions d and e have the relationship indicated, these employing a symmetric cipher.

Thus this system provides three levels of security. This is in addition to the security provided by the content key itself and the three levels authenticate the server to the client without regard to the content keys. The three levels of security are first the public key/private key security of the application private key and the application public key. The next level security is the derivation of the application secret key using the derivation functions D and $D_{id}$. The third level is the authentication steps which take place as shown at several points in both the application security module and the user security module regarding the variables, including IN, the transaction identifier, the asset identifier, and the first random number. Also note the effect of the double encryption shown in calculating the value SPC in the user security module, where this is an encryption of a set of values, the first one of which has already been encrypted. Of course this requires a similar double decryption by the application security module, as shown in FIG. 2.

TABLE

| Function or Variable Name | Significance |
|---|---|
| AC | Application Certificate |
| APk | Application Private Key |
| PuServ | Application Public Key |
| ASk | Application Secret Key |
| SK | Session Key |
| TId | Transaction Identifier |
| AR | Anti-Replay value |
| R1, R1 | Random or pseudo random numbers |
| DASk | Derived version of Application Secret Key |
| $D_{id}$ | Application Derivation function |
| CPC | Client Playback Context |
| MASk | Master Application Server Key |
| e(A)x | Encrypted (message A) with key x |
| AssetId | Asset (content) Identifier |
| Integrity | Integrity value |
| SPC | Server Playback Context |
| [A] | Encrypted version of message A (using a key k) |
| HU | Hash value (digest) |
| UDID | Unique Device Identifier |
| D | Server Derivation function |
| In | Integrity value |
| d(A)x | Decrypt (message A) with key x |
| CK | Content (Asset) Key |
| CKC | Content Key Context |
| IV | Initialization Vector for the AES cipher in CBC mode |
| CSSC | Key |
| Req | Request |
| Res | Response |
| Wrap Key | Key |

Relationships $D \oplus F = D_{id}$, [determined offline]

ASk=F(MASk, AC) [determined offline]

Cannot derive function F even if functions D, $D_{id}$ are known

Cannot derive function $D_{id}$ from function D d(e(A)k)k=A, where d and e both employ e.g. the AES (symmetric block) cipher in CBC mode While FIG. 2 shows a number of steps and sub-steps, it is to be understood in other embodiments some of these steps may be altered or omitted depending on the desired degree of security and the available computing resources. Moreover the security aspects here take place either in the user security module 30 or the application security module 18, thus relieving the application server 16 and the user application 28 of these security burdens.

Figure 3:
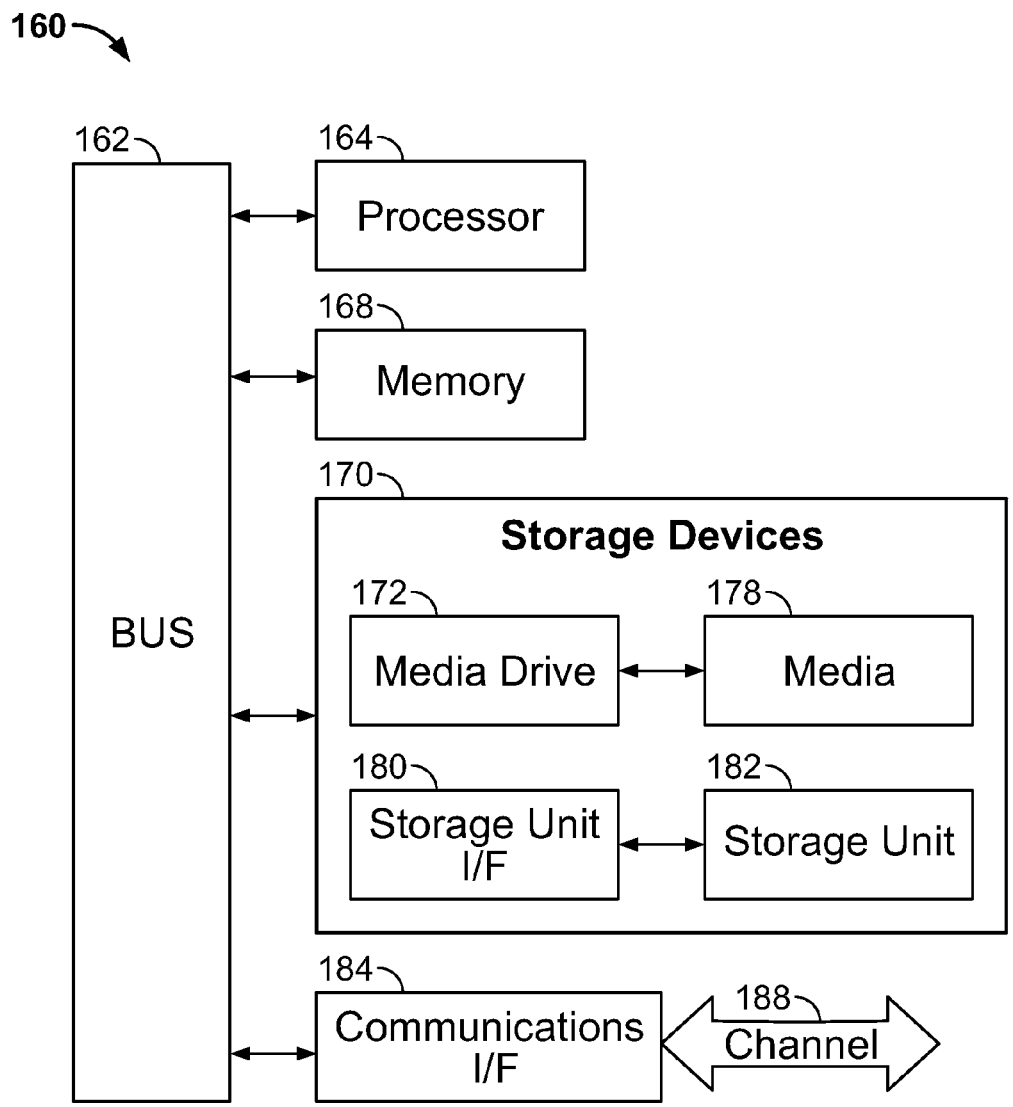
FIG. 3 is a depiction of a general computing system as would be used in the context of the FIG. 2 functionality.

FIG. 3 shows in a block diagram relevant portions of a conventional computing device (system or platform) 160 in accordance with the invention which carries out the method and its associated processes as described above. This is, e.g., a server platform, computer, mobile telephone, Smart Phone, personal digital assistant or similar device, or part of such a device and includes conventional hardware components executing in one embodiment software (computer code) which carries out the above examples. This code may be, e.g., in the C or C++ computer language or its functionality may be expressed in the form of firmware or hardware logic; writing such code or designing such logic would be routine in light of the above examples and logical expressions. Of course, the above examples are not limiting. Only relevant portions of this apparatus are shown for simplicity.

FIG. 3 thus illustrates detail of a typical and conventional embodiment of computing system 160 that may be employed to implement processing functionality in embodiments of the invention as indicated in FIG. 2 for the server platform and user device. Computing systems of this type may be used in a computer server or user (client) computer or other computing device, for example. Those skilled in the relevant art will also recognize how to implement embodiments of the invention using other computer systems or architectures. Computing system 160 may represent, for example, a desktop, laptop or notebook computer, hand-held computing device (personal digital assistant (PDA), cell phone, palmtop, etc.), mainframe, server, client, or any other type of special or general purpose computing device as may be desirable or appropriate for a given application or environment. Computing system 160 can include one or more processors, such as a processor 164. Processor 164 can be implemented using a general or special purpose processing engine such as, for example, a microprocessor, microcontroller or other control logic. In this example, processor 164 is connected to a bus 162 or other communications medium.

Computing system 160 can also include a main memory 168, such as random access memory (RAM) or other dynamic memory, for storing information and instructions to be executed by processor 164. Main memory 168 also may be used for storing temporary variables or other intermediate information during execution of instructions to be executed by processor 164. Computing system 160 may likewise include a read only memory (ROM) or other static storage device coupled to bus 162 for storing static information and instructions for processor 164.

Computing system 160 may also include information storage system 170, which may include, for example, a media drive 162 and a removable storage interface 180. The media drive 162 may include a drive or other mechanism to support fixed or removable storage media, such as flash memory, a hard disk drive, a floppy disk drive, a magnetic tape drive, an optical disk drive, a compact disk (CD) or digital versatile disk (DVD) drive (R or RW), or other removable or fixed media drive. Storage media 178 may include, for example, a hard disk, floppy disk, magnetic tape, optical disk, CD or DVD, or other fixed or removable medium that is read by and written to by media drive 162. As these examples illustrate, the storage media 178 may include a computer-readable storage medium having stored therein particular computer software or data.

In alternative embodiments, information storage system 170 may include other similar components for allowing computer programs or other instructions or data to be loaded into computing system 160. Such components may include, for example, a removable storage unit 182 and an interface 180, such as a program cartridge and cartridge interface, a removable memory (for example, a flash memory or other removable memory module) and memory slot, and other removable storage units 182 and interfaces 180 that allow software and data to be transferred from the removable storage unit 178 to computing system 160.

Computing system 160 can also include a communications interface 184. Communications interface 184 can be used to allow software and data to be transferred between computing system 160 and external devices. Examples of communications interface 184 can include a modem, a network interface (such as an Ethernet or other network interface card (NIC)), a communications port (such as for example, a USB port), a PCMCIA slot and card, etc. Software and data transferred via communications interface 184 are in the form of signals which can be electronic, electromagnetic, optical or other signals capable of being received by communications interface 184. These signals are provided to communications interface 184 via a channel 188. This channel 188 may carry signals and may be implemented using a wireless medium, wire or cable, fiber optics, or other communications medium. Some examples of a channel include a phone line, a cellular phone link, an RF link, a network interface, a local or wide area network, and other communications channels.

In this disclosure, the terms "computer program product," "computer-readable medium" and the like may be used generally to refer to media such as, for example, memory 168, storage device 178, or storage unit 182. These and other forms of computer-readable media may store one or more instructions for use by processor 164, to cause the processor to perform specified operations. Such instructions, generally referred to as "computer program code" (which may be grouped in the form of computer programs or other groupings), when executed, enable the computing system 160 to perform functions of embodiments of the invention. Note that the code may directly cause the processor to perform specified operations, be compiled to do so, and/or be combined with other software, hardware, and/or firmware elements (e.g., libraries for performing standard functions) to do so.

In an embodiment where the elements are implemented using software, the software may be stored in a computer-readable medium and loaded into computing system 160 using, for example, removable storage drive 174, drive 172 or communications interface 184. The control logic (in this example, software instructions or computer program code), when executed by the processor 164, causes the processor 164 to perform the functions of embodiments of the invention as described herein.

This disclosure is illustrative and not limiting. Further modifications will be apparent to these skilled in the art in light of this disclosure and are intended to fall within the scope of the appended claims.

We claim:

1. A computer enabled method of communicating between a client and a server over a computer network, comprising:
    transmitting an application certificate from the server to the client;
    checking the received application certificate at the client;
    generating, at the client, a session key and a random or pseudo random number;
    retrieving, at the client, a master session key;
    computing a first application key at the client by applying a first derivation function to the master session key, the application certificate, and the random or pseudo random number;
    computing session data at the client by encrypting a first data, using a public key of the server, the first data including the random or pseudo random number and an encrypted second data, the second data including the session key, wherein the second data is encrypted using the first application key as its encryption key;
    transmitting the session data to the server;
    at the server, decrypting the session data using a private key of the server to extract the first data, the first data including the random or pseudo random number and the encrypted second data, and computing the first application key by applying a second derivation function to the random or pseudo random number and a second application key, the second application key computed using the master session key and the application certificate, and wherein the second derivation function, in association with a generalized function, can derive the same result as the first derivation function, the first application key used to extract the session key from the encrypted second data;
    encrypting a content key for an asset at the server, using the extracted session key;
    encrypting content data including the content key previously encrypted by the session key at the server, and transmitting the encrypted content data to the client; and
    at the client, extracting the content key from the content data and decrypting the asset using the content key, wherein the asset is received by the client, separately, in encrypted form, and wherein the asset is encrypted using the content key.

2. The method of claim 1, wherein the second derivation function is not computable from the first derivation function.

3. The method of claim 1, wherein a software module associated with the server performs:
    decrypting the session data and extracting the session key,
    encrypting the content key using the extracted session key, and
    encrypting content data including the previously encrypted content key using the session key.

4. The method of claim 1, wherein a software module associated with the client performs:
    checking the received application certificate,
    generating the session key and the random or pseudo random number,
    retrieving the master session key,
    computing the first application key,
    computing the session data, and
    extracting the content key from the encrypted content data.

5. A non-transitory computer readable storage medium storing instructions which when executed by a server computer performs a method, the method comprising:
    decrypting the session data and extracting the session key, encrypting the content key using the extracted session key, and encrypting content data including the previously encrypted content key using the session key of claim 1.

6. A non-transitory computer readable storage medium storing instructions which when executed by a client computer performs a method, the method comprising: checking the received application certificate, generating the session key and the random or pseudo random number, retrieving the master session key, computing the first application key, computing the session data, and extracting the content key from the encrypted content data of claim 1.

7. The method of claim 1, wherein the asset is decrypted using an AES CBC cipher.

8. A computer enabled method of communicating between a client and a server over a computer network performed by the client, the method comprising:
    receiving an application certificate from the server;
    checking the received application certificate;
    generating a random or pseudo random number and a session key;
    retrieving a master session key from memory;
    computing a first application key by applying a first derivation function to the master session key, the application certificate, and the random or pseudo random number;
    computing session data by encrypting, using a public key of the server, a first data including the random or pseudo random number and an encrypted second data, wherein the second data is encrypted using the first application key and the second data includes the session key;
    transmitting the session data to the server;

receiving an encrypted content data, wherein the encrypted content data, when decrypted, includes an encrypted content key, wherein the server decrypted the session data using a private key to extract the first data, the first data including the random or pseudo random number and the encrypted second data, and the server computed the first application key by applying a second derivation function to the random or pseudo random number and a second application key, the second application key computed by the server using the master session key and the application certificate, and wherein the second derivation function, in association with a generalized function, can derive the same result as the first derivation function, and wherein the first application key was used to decrypt the second data to extract the session key, wherein the session key is used to encrypt the content key, and wherein the session key is also used to encrypt the content data, the content data including the previously encrypted content key, and wherein the server transmitted the encrypted content data to the client; and extracting the content key from the encrypted content data by decrypting the content data and then decrypting the content key, and decrypting an asset using the extracted content key, wherein the asset is received by the client, separately, in encrypted form, the asset encrypted using the content key.

9. The method of claim 8, wherein the second derivation function is not computable from the first derivation function.

10. The method of claim 8, wherein the method is performed by a software module associated with the client.

11. A non-transitory computer readable storage medium storing computer code for carrying out the method of claim 8.

12. The method of claim 8, wherein the session data includes an anti-replay value and an integrity value.

13. A client computing apparatus coupled to a processing system and a memory system, including volatile and non-volatile memory, for communicating with a server over a computer network, the client computing apparatus in association with the processing system, the memory system and the storage system configured to:
store an application certificate received from the server;
check the received application certificate;
generate a random or pseudo random number and a session key;
store a master session key;
compute a first application key by applying a first derivation function to the master session key, the application certificate, and the random or pseudo random number;
compute a session data by encrypting a first data, using a public key of the server, the first data including the random or pseudo random number and an encrypted second data, the second data including the session key, the second data encrypted using the first application key;
transmit the session data to the server;
receive, from the server, an encrypted content data, the content data, when decrypted, includes an encrypted content key, wherein the server decrypted the session data using a private key to extract the first data including the random or pseudo random number and the encrypted second data, and the server computed the first application key by applying a second derivation function to the random or pseudo random number and a second application key, the second application key computed using the master session key and the application certificate, and wherein the second derivation function, in association with a generalized function, can derive the same result as the first derivation function, and wherein the first application key was used to decrypt the second data, and wherein the server used the extracted session key to encrypt a content key and the server, using the session key, encrypted a content data, the content data including the encrypted content key, and wherein the server transmitted the encrypted content data to the client; and extract the content key from the encrypted content data by decrypting the content data and then decrypting the content key, and decrypting an asset using the extracted content key, wherein the asset is received by the client computing apparatus, separately, in encrypted form, wherein the asset is encrypted using the content key.

14. A computer enabled method of communicating between a client and a server over a computer network performed by the server, the method comprising:
transmitting an application certificate to the client;
receiving an encrypted session data in response, from the client;
decrypting the session data using a private key of the server to extract a first data including a random or pseudo random number and an encrypted second data, the second including a session key, wherein the client, prior to transmitting the encrypted session data, encrypted the second data encrypted using a first application key as its encryption key, and wherein the first application key was computed by the client using first deviation function to a master session key, the random or pseudo random number, and the application certificate;
computing the first application key by applying a second derivation function to the random or pseudo random number and a second application key to decrypt the second data and extract the session key from the second data, wherein the second application key is computed using the master session key and the application certificate, and wherein the second derivation function, in association with a generalized function, can derive the same result as the first derivation function;
encrypting a content key using the extracted session key; and
encrypting content data including the previously encrypted content key, and transmitting the encrypted content data to the client to decrypt an asset, wherein the asset is received by the client, separately, and wherein the asset is encrypted using the content key.

15. The method of claim 14, wherein the second derivation function is not computable from the first derivation function.

16. The method of claim 14, wherein the method is performed by a software module associated with the server.

17. A non-transitory computer readable storage medium storing computer code for carrying out the method of claim 14.

18. The method of claim 14, wherein the decrypted session data includes an anti-replay value and an integrity value, and further comprising the processor verifying the integrity value at the server.

19. A server computing apparatus coupled to a processing system and a memory system, including volatile and non-volatile memory, for communicating with a client over a computer network, the server computing apparatus, in association with the processing system and the memory system and the storage system, configured to:
store an application certificate to be transmitted to the client;
receive session data from the client in response to the transmitted application certificate;
decrypt the session data using a private key of the server to extract a first data including a random or pseudo random number and an encrypted second data, the second including a session key, wherein the client, prior to transmitting the encrypted session data, encrypted the second data encrypted using a first application key as its encryption key, and wherein the first application key was computed by the client using a master session key, the random or pseudo random number, and the application certificate;

compute the first application key by applying a derivation function to the extracted random or pseudo random number and a second application key to decrypt the second data and extract the session key from the second data, wherein the second application key is computed using the master session key and the application certificate, and wherein the second derivation function, in association with a generalized function, can derive the same result as the first derivation function;

encrypt a content key for an asset, using the extracted session key; and encrypt a content data, the content data including the previously encrypted content key using the session key, and transmitting the encrypted content data to the client to decrypt an asset, wherein the asset is transmitted to the client, separately, and the asset is encrypted using the content key.

20. The method of claim 1, wherein the first data further comprises a transaction identifier.

21. The method of claim 1, wherein the first data further comprises an asset identifier anti-play value.

22. The method of claim 1, wherein the second data comprises another random or pseudo-random number.

23. The method of claim 1, wherein the first data further comprises a transaction identifier.

24. The method of claim 1, wherein the first data further comprises an asset identifier anti-play value.

25. The method of claim 1, wherein the second data comprises another random or pseudo-random number.

26. The apparatus of claim 19, wherein the first data further comprises a transaction identifier.

27. The apparatus of claim 19, wherein the first data further comprises an asset identifier anti-play value.

28. The apparatus of claim 19, wherein the second data comprises another random or pseudo-random number.

* * * * *